(12) United States Patent
Wakudkar et al.

(10) Patent No.: US 12,598,546 B2
(45) Date of Patent: Apr. 7, 2026

(54) SUCCESSIVE INTERFERENCE MITIGATION IN AUTOMATED FREQUENCY COORDINATION (AFC)

(71) Applicant: Cisco Technology, Inc., San Jose, CA (US)

(72) Inventors: Sachin D. Wakudkar, St-Sulpice (CH); Shailender Potharaju, Fremont, CA (US); Evgeny Yankevich, Beachwood, OH (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 401 days.

(21) Appl. No.: 18/301,539

(22) Filed: Apr. 17, 2023

(65) Prior Publication Data

US 2024/0349173 A1     Oct. 17, 2024

(51) Int. Cl.
*H04W 48/16*      (2009.01)
*H04W 48/08*      (2009.01)
*H04W 72/0453*      (2023.01)

(52) U.S. Cl.
CPC ........... *H04W 48/16* (2013.01); *H04W 48/08* (2013.01); *H04W 72/0453* (2013.01)

(58) Field of Classification Search
CPC . H04W 48/16; H04W 48/08; H04W 72/0453; H04W 72/541; H04W 24/02
See application file for complete search history.

(56) References Cited

U.S. PATENT DOCUMENTS

| | | |
|---|---|---|
| 2020/0236558 A1 | 7/2020 | Damnjanovic et al. |
| 2020/0359229 A1 | 11/2020 | Macmullan et al. |
| 2021/0120556 A1 | 4/2021 | Segev et al. |
| 2022/0272544 A1 | 8/2022 | Chitrakar et al. |
| 2022/0329979 A1 | 10/2022 | Ansley et al. |
| 2024/0303431 A1* | 9/2024 | Annadi ................... G06F 40/40 |
| 2025/0105929 A1* | 3/2025 | Li ...................... H04B 17/3913 |

OTHER PUBLICATIONS

Juniper Networks "AFC and 6 GHZ Incumbents" https://www.mist. com, Jun. 15, 2020, (6 pages).

* cited by examiner

*Primary Examiner* — Diane D Mizrahi
(74) *Attorney, Agent, or Firm* — Merchant & Gould P.C.

(57) ABSTRACT

Successive interference mitigation in Automated Frequency Coordination (AFC) may be provided. A plurality of messages may be received from a respective plurality of Access Points (APs). Each of the plurality of messages may indicate a respective channel used by a respective one of the plurality of APs associated with the message. An indication may be received that an Interference to Noise (I/N) ratio is above a predetermined threshold in a Fixed Service (FS) channel associated with an FS. At least one of the plurality of APs may be identified as a cause of the I/N ratio being above the predetermined threshold in the FS channel based on a channel used by the identified at least one of the plurality of APs and the FS channel. An action may be taken against the identified at least one of the plurality of APs to lower the I/N ratio.

20 Claims, 3 Drawing Sheets

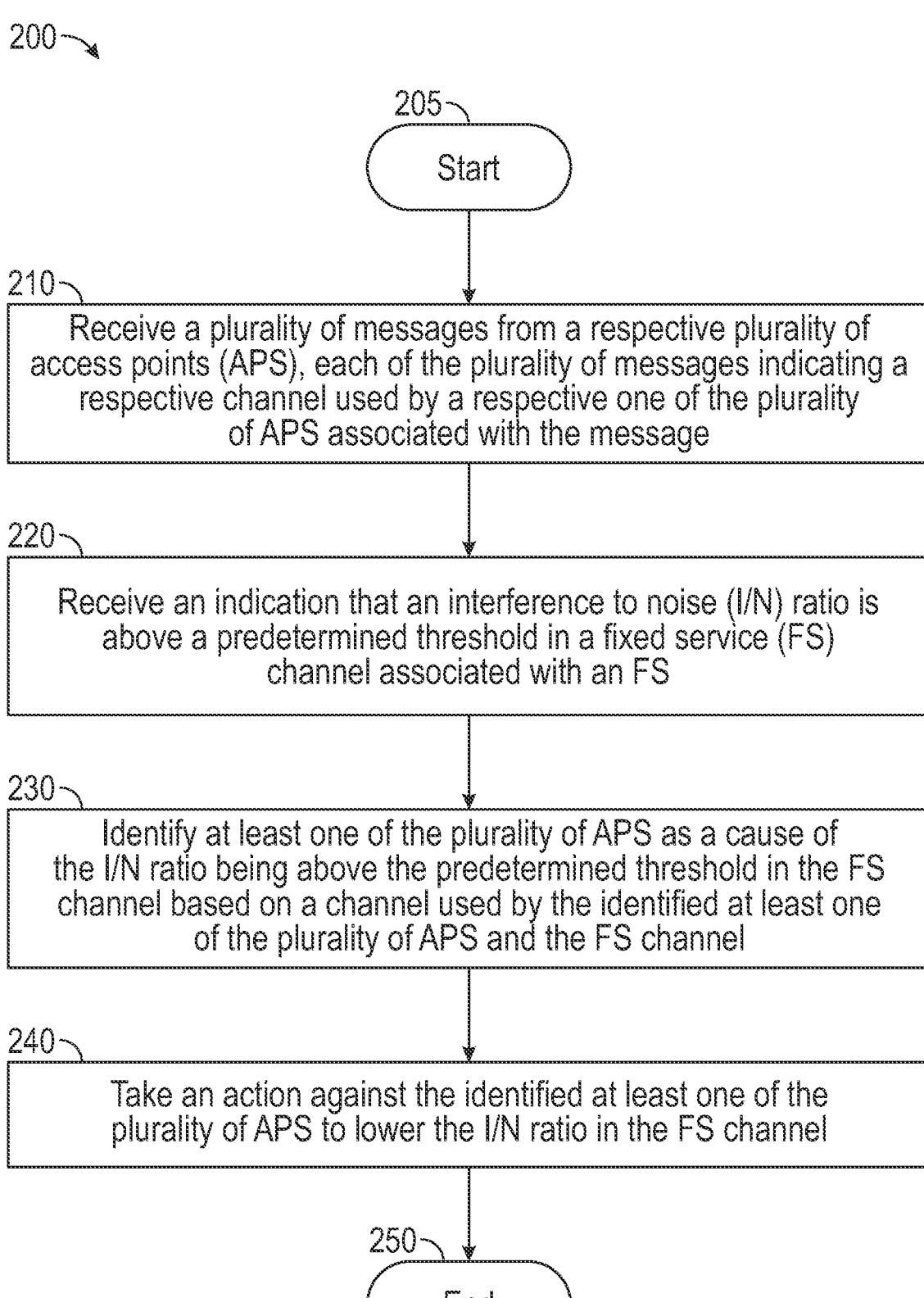

200

205
Start

210
Receive a plurality of messages from a respective plurality of access points (APS), each of the plurality of messages indicating a respective channel used by a respective one of the plurality of APS associated with the message 220
Receive an indication that an interference to noise (I/N) ratio is above a predetermined threshold in a fixed service (FS) channel associated with an FS 230
Identify at least one of the plurality of APS as a cause of the I/N ratio being above the predetermined threshold in the FS channel based on a channel used by the identified at least one of the plurality of APS and the FS channel 240
Take an action against the identified at least one of the plurality of APS to lower the I/N ratio in the FS channel 250
End

FIG. 2

SUCCESSIVE INTERFERENCE MITIGATION IN AUTOMATED FREQUENCY COORDINATION (AFC)

TECHNICAL FIELD

The present disclosure relates generally to providing successive interference mitigation in Automated Frequency Coordination (AFC).

BACKGROUND

In computer networking, a wireless Access Point (AP) is a networking hardware device that allows a WiFi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where WiFi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for providing successive interference mitigation in AFC.

DETAILED DESCRIPTION

Overview

Figure 1:
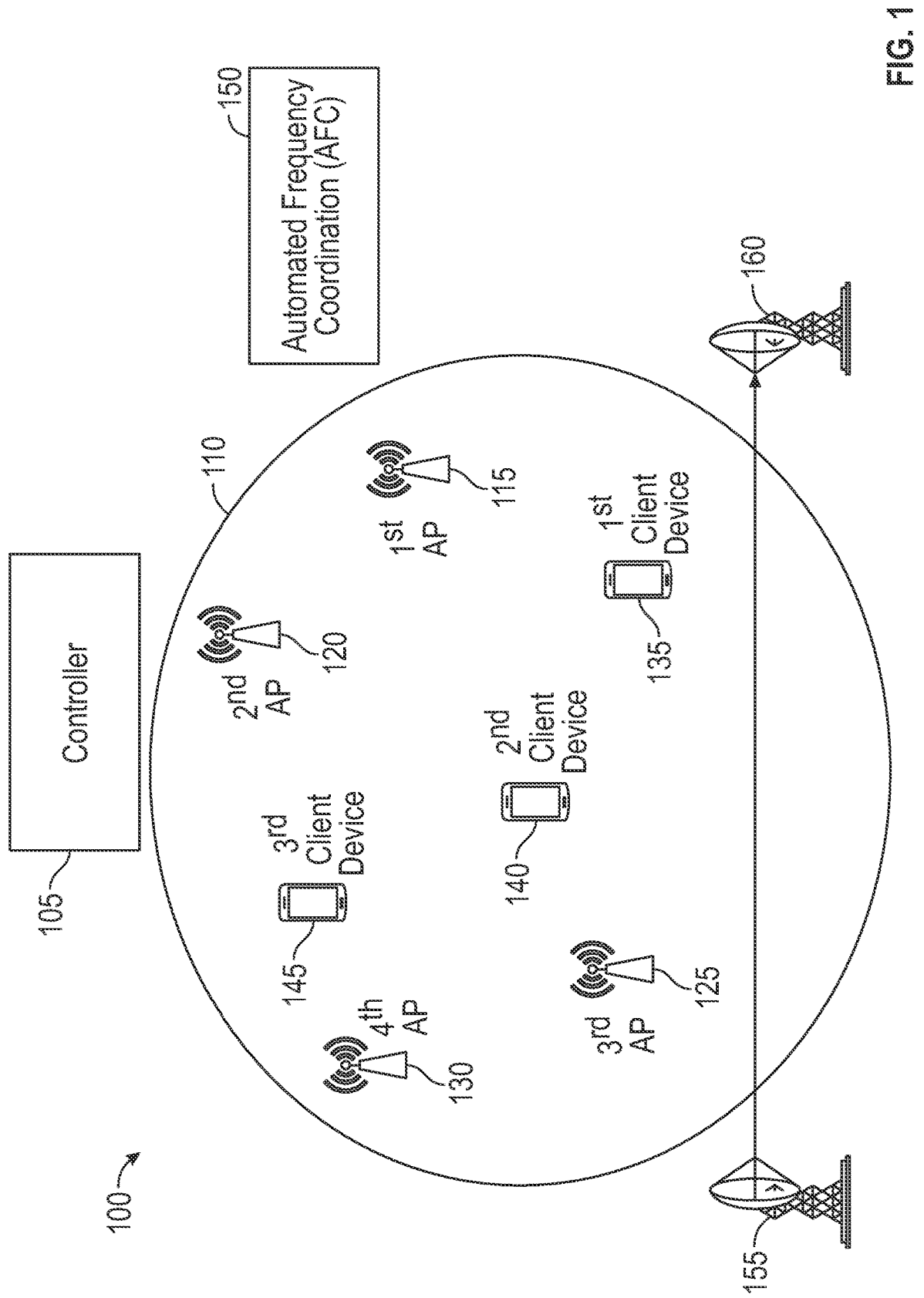
FIG. 1 is a block diagram of an operating environment for providing successive interference mitigation in Automated Frequency Coordination (AFC)

Successive interference mitigation in Automated Frequency Coordination (AFC) may be provided. A plurality of messages may be received from a respective plurality of Access Points (APs). Each of the plurality of messages may indicate a respective channel used by a respective one of the plurality of APs associated with the message. An indication may be received that an Interference to Noise (I/N) ratio is above a predetermined threshold in a Fixed Service (FS) channel associated with an FS. At least one of the plurality of APs may be identified as a cause of the I/N ratio being above the predetermined threshold in the FS channel based on a channel used by the identified at least one of the plurality of APs and the FS channel. An action may be taken against the identified at least one of the plurality of APs to lower the I/N ratio in the FS channel.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

AFC service providers may provide a framework with an acceptable model of WiFi network interference to Fixed Services (FS) (i.e., incumbents). As the AFC services are being provided, a challenge may comprise when an FS complains about interferences, there may be no way to identify which WiFi AP could be causing the interference. With conventional systems, the AFC may indicate available channels and power levels, but may not know what channel is being used by a given AP.

When an interference is detected in an area for a specific FS operating on a specific channel, it may be possible that all unlicensed services could be pulled down, which may impact the whole network in the regional area even though they may not be using the channels or causing interference. Accordingly, embodiments of the disclosure may provide a process to leverage such capability and to minimize the interference with more optimal WiFi channel allowance.

FIG. 1 shows an operating environment 100 providing successive interference mitigation in Automated Frequency Coordination (AFC). As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125, and a fourth AP 130. The plurality of APs may provide wireless network access to a plurality of client devices as they move within coverage environment 110. The plurality of client devices may comprise, but are not limited to, a first client device 135, a second client device 140, and a third client device 145. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

The plurality of APs and the plurality of client devices may use Multi-Link Operation (MLO) where they simultaneously transmit and receive across different bands and channels by establishing two or more links to two or more AP radios. These bands may comprise, but are not limited the 2 GHz band, the 5 GHz band, the 6 GHz band, and the 60 GHz band.

Controller 105 may comprise a Wireless Local Area Network controller (WLC) and may provision and control coverage environment 110 (e.g., a WLAN). Controller 105 may allow first client device 135, second client device 140, and third client device 145 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide successive interference mitigation in AFC.

In order for unlicensed devices (e.g., WiFi devices such as client devices and APs) to work with the licensed users already occupying a band (e.g., the 6 GHz band), AFC was established. AFC is a spectrum use coordination system. For example, because the 6 GHz band was already occupied by incumbent users (i.e., Fixed Services (FS)), such as fixed satellite providers, restrictions may be placed on the WiFi devices looking to transmit in this band. To avoid potential interference with existing 6 GHz incumbents, AFC may impose two types of device classifications with different transmit power rules for WiFi devices operating on the band: i) low power APs for indoor WiFi and ii) standard power APs that may be used indoors and outdoors.

As shown in FIG. 1, AFC 150 may provide spectrum use coordination for coverage environment 110. A transmitter 155 and a receiver 160 may comprise a licensed FS incumbent user. First AP 115, second AP 120, third AP 125, and fourth AP 130 may comprise unlicensed devices. AFC 150 may coordinate spectrum use between the licensed and unlicensed to avoid potential interference in coverage environment 110.

The elements described above of operating environment 100 (e.g., controller 105, first AP 115, second AP 120, third AP 125, fourth AP 130, first client device 135, second client device 140, or third client device 145) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

FIG. 2 is a flow chart setting forth the general stages involved in a method 200 consistent with embodiments of the disclosure for providing successive interference mitigation in Automated Frequency Coordination (AFC). Method 200 may be implemented using a computing device 300 (e.g., operated by an AFC provider in AFC 150) as described in more detail below with respect to FIG. 3. Ways to implement the stages of method 200 will be described in greater detail below.

Conventional AFC messaging may be based on a per AP inquiry to provide the allowed channels for that specific AP in a certain geolocation. Depending on the type of inquiry, the AFC may report a list of the entire allowable channels based on the requested bandwidth or may only reply with the certain requested channel allowance.

It is expected that the amount of the interference on incumbent networks may go above the regulated requirements in many situations. This may potentially come from multiple reasons such as incorrect location reporting of APs, incorrect propagation modelling at the AFC system, inaccurate power level of AP transmitter, etc.

When a larger-than-expected interference to noise ratio (e.g., >−6 dB) happens in a certain channel at an FS, the AFC system may need to switch all the new inquiries to Low Power Indoor (LPI) for those channels. Therefore, because of the presence of a not-well-regulated WLAN deployment in a certain regional area, the entire WiFi-6E networks may need to drop to LPI in that channel.

Embodiments of the disclosure may provide a solution based on a previous channel usage reporting (i.e., historical used channel) per AFC inquiry message. Then, the AFC system may be aware of the actual used channels per AP and it can store it in a database.

Method 200 may begin at starting block 205 and proceed to stage 210 where computing device 300 may receive a plurality of messages from a respective plurality of Access Points (APs), each of the plurality of messages indicating a respective channel used by a respective one of the plurality of APs associated with the message. For example, first AP 115, second AP 120, third AP 125, and fourth AP 130 may each send to computing device 300 (e.g., disposed in AFC 150) available spectrum inquiry messages. These available spectrum inquiry messages may include previous channel usage for each AP. Computing device 300 may estimates path loss and may compute I/N based on the previously used channel. Then, computing device 300 may store the APs in Standard Power Indoor (SPI) mode based on their expected I/N values. The expected interference of all the APs may be less than the threshold, but it does not guarantee the actual interference meets this requirement.

Computing device 300 may then sort the APs based on I/N in each channel from each AP. The geolocation of APs and the distances to the FS may also be considered as another metric to better sort the APs in the list. If the I/N of two or more APs are similar, the distance to the FS may be considered as another sorting factor. The lower distance may be on top in the list.

Then computing device 300 may estimate the probability of an AP (e.g., starting from top of the list) being the source of extra interference. This estimation may be based on a priori information such as presence of Non-Line of Sight (NLOS) and indoor/outdoor deployment. A weighted metric that may be proportional to the probability of higher interference may be calculated.

In another embodiment, an unsupervised clustering may be used to group the APs into suspected and not-suspected groups. The inputs of the clustering algorithm may be similar to weighted sum method with the difference of grouping the APs into two sets (e.g., instead of regression per AP provided above). In this embodiment, all the metrics may be mapped into numerical values and may be normalized. Because the number of clusters is known (e.g., 2), any clustering method such as k-means may be used for identifying the suspected APs from the rest.

From stage 210, where computing device 300 receives the plurality of messages from the respective plurality of APs, method 200 may advance to stage 220 where computing device 300 may receive an indication that an I/N ratio is above a predetermined threshold in a FS channel associated with an FS. For example, third AP 125 may be on the same channel as transmitter 155 and receiver 160 pair and may be interfering with the FS. The FS may detect this excessive interference and may report it to AFC 150.

Once computing device 300 receives the indication that the I/N ratio is above the predetermined threshold in the FS channel associated with an FS in stage 220, method 200 may continue to stage 230 where computing device 300 may identify at least one of the plurality of APs as a cause of the I/N ratio being above the predetermined threshold in the FS channel based on a channel used by the identified at least one of the plurality of APs and the FS channel. For example, using the sorted list above, computing device may determine that third AP 125 has the highest probability of being the source of the interference.

After computing device 300 identifies the at least one of the plurality of APs as the cause of the I/N ratio being above the predetermined threshold in stage 230, method 200 may proceed to stage 240 where computing device 300 may take an action against the identified at least one of the plurality of APs to lower the I/N ratio in the FS channel. For example, computing device 300 may cause third AP 125 to switch to LPI or it may cause third AP 125 to change to a different channel. This action may mitigate the excessive interference. Once computing device 300 takes the action against the identified at least one of the plurality of APs to lower the I/N ratio in the FS channel in stage 240, method 200 may then end at stage 250.

Figure 3:
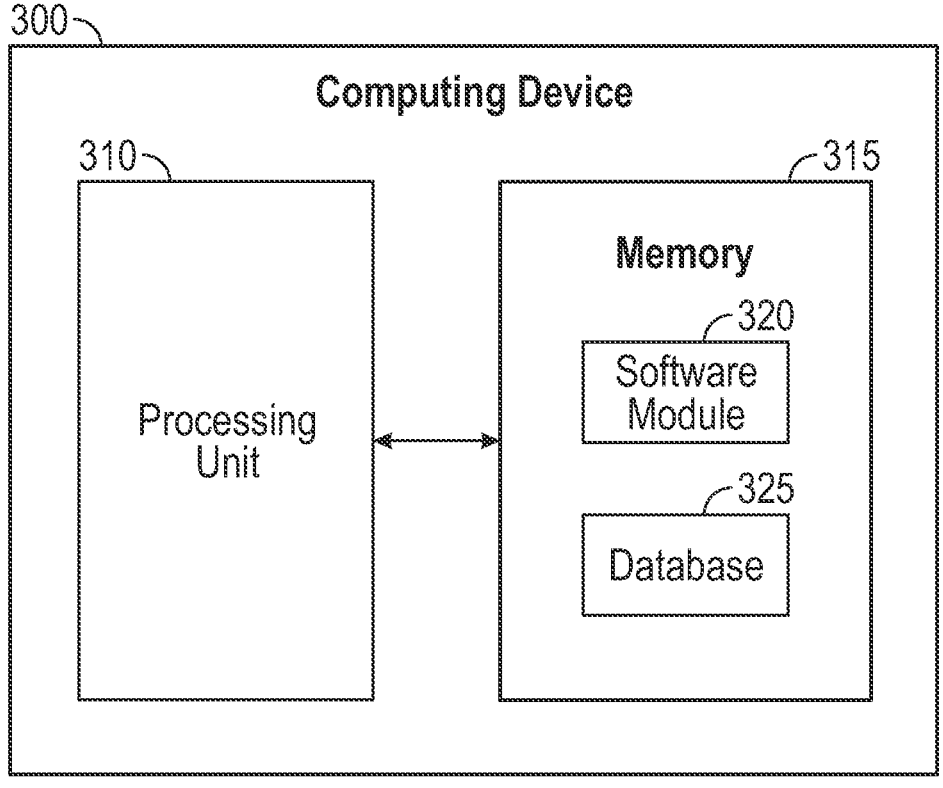
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing successive interference mitigation in Automated Frequency Coordination (AFC) as described above with respect to FIG. 2. Computing device 300, for example, may provide an operating environment for controller 105, first AP 115, second AP 120, third AP 125, fourth AP 130, first client device 135, second client device 140, or third client device 145. Controller 105, first AP 115, second AP 120, third AP 125, fourth AP 130, first client device 135, second client device 140, or third client device 145 may operate in other environments and are not limited to computing device 300.

Computing device 300 may be implemented using a WiFi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a plurality of messages from a respective plurality of Access Points (APs), each of the plurality of messages indicating a respective channel used by a respective one of the plurality of APs associated with a respective message;
   determining an Interference to Noise (I/N) ratio from the plurality of messages received rom the respective plurality of APs;
   receiving an indication that the I/N ratio is greater than a predetermined threshold in a Fixed Service (FS) channel associated with an FS;
   identifying at least one of the plurality of APs as a cause of the I/N ratio being greater than the predetermined threshold in the FS channel based on a channel used by the identified at least one of the plurality of APs and the FS channel; and
   taking an action against the identified at least one of the plurality of APs to decrease the I/N ratio in the FS channel.

2. The method of claim 1, wherein the plurality of messages comprise a plurality of available spectrum inquiry messages.

3. The method of claim 1, wherein identifying the at least one of the plurality of APs comprises creating a plurality of I/N ratio values respectively associated with the plurality of APs, wherein each of the plurality of I/N ratio values respectively comprises an I/N ratio value that each of the respective plurality of APs is expected to cause on their respective channel.

4. The method of claim 3, further comprising sorting the plurality of I/N ratio values for each channel.

5. The method of claim 4, further comprising determining, based on the sorted plurality of I/N values, a plurality of probability values, wherein the plurality of probability values comprises a probability that each of the respective plurality of APs is the cause of the I/N ratio being above the predetermined threshold in the FS channel.

6. The method of claim 5, further comprising identifying the at least one of the plurality of APs with a highest probability as the cause of the I/N ratio being above the predetermined threshold in the FS channel.

7. The method of claim 1, wherein identifying the at least one of the plurality of APs comprises an unsupervised clustering to group the plurality of APs into suspected and not-suspected groups.

8. The method of claim 1, wherein taking the action comprises causing the identified at least one of the plurality of APs to switch to Low Power Indoor (LPI).

9. The method of claim 1, wherein taking the action comprises causing the identified at least one of the plurality of APs to switch to a different channel.

10. A system comprising:
   a memory storage; and
   a processing unit coupled to the memory storage, wherein the processing unit is operative to:
      receive a plurality of messages from a respective plurality of Access Points (APs), each of the plurality of messages indicating a respective channel used by a respective one of the plurality of APs associated with a respective message;
      determine an Interference to Noise (I/N) ratio from the plurality of messages received from the respective plurality of APs;
      receive an indication that the I/N ratio is greater than a predetermined threshold in a Fixed Service (FS) channel associated with an FS;
      identify at least one of the plurality of APs as a cause of the I/N ratio being greater than the predetermined threshold in the FS channel based on a channel used by the identified at least one of the plurality of APs and the FS channel; and
      take an action against the identified at least one of the plurality of APs to decrease the I/N ratio in the FS channel.

11. The system of claim 10, wherein the plurality of messages comprise a plurality of available spectrum inquiry messages.

12. The system of claim 10, wherein the processing unit being operative to identify the at least one of the plurality of APs comprises the processing unit being operative to create a plurality of I/N ratio values respectively associated with the plurality of APs, wherein each of the plurality of I/N ratio values respectively comprises an I/N ratio value that each of the respective plurality of APs is expected to cause on their respective channel.

13. The system of claim 12, wherein the processing unit is further operative to sort the plurality of I/N ratio values for each channel.

14. The system of claim 13, wherein the processing unit is further operative to determine, based on the sorted plurality of I/N values, a plurality of probability values, wherein the plurality of probability values comprises a probability that each of the respective plurality of APs is the cause of the I/N ratio being above the predetermined threshold in the FS channel.

15. The system of claim 14, wherein the processing unit is further operative to identify the at least one of the plurality of APs with a highest probability as the cause of the I/N ratio being above the predetermined threshold in the FS channel.

16. A non-transitory computer-readable medium that stores a set of instructions which when executed perform a method executed by the set of instructions comprising:
   receiving a plurality of messages from a respective plurality of Access Points (APs), each of the plurality of messages indicating a respective channel used by a respective one of the plurality of APs associated with a respective message;

determining an Interference to Noise (I/N) ratio from the plurality of messages received from the respective plurality of APs;

receiving an indication that the I/N ratio is above greater than a predetermined threshold in a Fixed Service (FS) channel associated with an FS;

identifying at least one of the plurality of APs as a cause of the I/N ratio being greater than the predetermined threshold in the FS channel based on a channel used by the identified at least one of the plurality of APs and the FS channel; and taking an action against the identified at least one of the plurality of APs to decrease the I/N ratio in the FS channel.

17. The non-transitory computer-readable medium of claim 16, wherein the plurality of messages comprise a plurality of available spectrum inquiry messages.

18. The non-transitory computer-readable medium of claim 16, wherein identifying the at least one of the plurality of APs comprises an unsupervised clustering to group the plurality of APs into suspected and not-suspected groups.

19. The non-transitory computer-readable medium of claim 16, wherein taking the action comprises causing the identified at least one of the plurality of APs to switch to Low Power Indoor (LPI).

20. The non-transitory computer-readable medium of claim 16, wherein taking the action comprises causing the identified at least one of the plurality of APs to switch to a different channel.

* * * * *